United States Patent
Werner et al.

(10) Patent No.: US 9,555,664 B2
(45) Date of Patent: Jan. 31, 2017

(54) WHEEL SPIDER

(71) Applicant: THYSSENKRUPP CARBON COMPONENTS GMBH, Kesselsdorf (DE)

(72) Inventors: Jens Werner, Coswig (DE); Christian Köhler, Dresden (DE); André Bartsch, Dresden (DE); Sandro Mäke, Dohma (DE); Michael Dreßler, Dresden (DE); Martin Lepper, Dresden (DE); Werner Hufenbach, Dresden (DE)

(73) Assignee: THYSSENKRUPP CARBON COMPONENTS GMBH, Kesselsdorf (DE)

( * ) Notice: Subject to any disclaimer, the term of this patent is extended or adjusted under 35 U.S.C. 154(b) by 0 days.

(21) Appl. No.: 14/363,157

(22) PCT Filed: Dec. 3, 2012

(86) PCT No.: PCT/EP2012/074185
§ 371 (c)(1),
(2) Date: Jun. 5, 2014

(87) PCT Pub. No.: WO2013/083500
PCT Pub. Date: Jun. 13, 2013

(65) Prior Publication Data
US 2014/0346847 A1 Nov. 27, 2014

(30) Foreign Application Priority Data
Dec. 7, 2011 (DE) .......................... 10 2011 087 938

(51) Int. Cl.
*B60B 1/06* (2006.01)
*B60B 5/02* (2006.01)
(Continued)

(52) U.S. Cl.
CPC ................. *B60B 5/02* (2013.01); *B29C 70/34* (2013.01); *B29L 2031/32* (2013.01);
(Continued)

(58) Field of Classification Search
CPC ............ B60B 5/02; B60B 1/0207; B60B 1/08; B60B 1/0246; B60B 2360/342; B60B 2360/3422; B60B 2360/3424; B60B 2360/3462
(Continued)

(56) References Cited

U.S. PATENT DOCUMENTS 1,462,865 A * 7/1923 Lieckfelt ................... B60B 9/26
152/80
3,917,352 A * 11/1975 Gageby ................... B29C 70/24
301/64.702
(Continued)

FOREIGN PATENT DOCUMENTS

CN 21 31 727 Y 5/1993
CN 12 42 826 A 1/2000
(Continued)

*Primary Examiner* — Jeffrey J Restifo
(74) *Attorney, Agent, or Firm* — McGlew and Tuttle, P.C.

(57) ABSTRACT

A wheel with a rim as well as a wheel spider, where the wheel spider has a hub and spokes. The wheel includes spokes including one or more linearly stretched textile strands as reinforcement material of a fiber composite and each linearly stretched textile strand runs at least once from the rim to the hub and back without interruption and thus forms at least one spoke. The textile strands are connected in a positive-locking manner and/or in substance with the hub and the rim. A process is provided for the manufacture of the wheel.

20 Claims, 16 Drawing Sheets

(51) Int. Cl.
  *B29C 70/34* (2006.01)
  *B29L 31/32* (2006.01)
(52) U.S. Cl.
  CPC ....... *B60B 2310/20* (2013.01); *B60B 2360/34* (2013.01); *B60B 2360/3464* (2013.01)
(58) Field of Classification Search
  USPC ....... 301/64.702, 64.703, 64.704, 67, 95.107
  See application file for complete search history.

(56) References Cited

U.S. PATENT DOCUMENTS

| | | | | |
|---|---|---|---|---|
| 4,000,926 A * | 1/1977 | Wlcox | ...................... | B60B 5/02 264/46.9 |
| 4,173,992 A * | 11/1979 | Lejeune | .................... | B60B 5/02 152/381.3 |
| 4,183,259 A * | 1/1980 | Giovachini | ............. | F16C 15/00 74/572.1 |
| 4,294,490 A * | 10/1981 | Woelfel | .................. | B29C 53/60 301/64.703 |
| 4,497,766 A * | 2/1985 | Olsson | .................... | B29C 45/26 249/56 |
| 4,511,184 A * | 4/1985 | Schauf | ............... | B29C 45/0046 264/257 |
| 4,527,839 A * | 7/1985 | Fujitaka | .................... | B60B 5/02 301/64.704 |
| 4,681,647 A * | 7/1987 | Kondo | .................. | B29C 53/564 156/172 |
| 4,749,235 A * | 6/1988 | McDougall | ............... | B60B 5/02 301/64.703 |
| 5,549,360 A * | 8/1996 | Lipeles | ..................... | B60B 5/02 301/64.703 |
| 5,915,796 A * | 6/1999 | Beyer | ...................... | B60B 5/02 264/640 |
| 6,042,194 A * | 3/2000 | Fitz | ........................... | B60B 1/10 29/894.34 |
| 6,196,638 B1 * | 3/2001 | Mizuno | .................... | B60B 1/00 301/104 |
| 6,244,669 B1 * | 6/2001 | Braunschweiler | ........ | B60B 9/02 301/79 |
| 6,520,595 B1 * | 2/2003 | Schlanger | ............... | B60B 1/003 301/110.5 |
| 6,637,828 B2 * | 10/2003 | Braunschweiler | ........ | B60B 9/02 301/104 |
| 6,926,370 B2 * | 8/2005 | Spoelstra | ................ | B29C 70/48 301/64.703 |
| 7,309,110 B2 * | 12/2007 | Vernet | ....................... | B60B 5/02 152/516 |
| 7,959,236 B2 * | 6/2011 | Mercat | .................... | B60B 1/003 152/381.6 |
| 8,783,789 B2 * | 7/2014 | Hendel | ..................... | B60B 1/06 301/64.702 |
| 2010/0019564 A1 * | 1/2010 | Theuer | .................. | B29C 70/347 301/64.703 |
| 2013/0020856 A1 * | 1/2013 | Dick | ......................... | B60B 3/02 301/37.107 |
| 2014/0333121 A1 * | 11/2014 | Hufenbach | ........... | B29C 70/462 301/63.101 |
| 2014/0346847 A1 * | 11/2014 | Werner | ................... | B29C 70/34 301/64.703 |
| 2015/0224818 A1 * | 8/2015 | Hufenbach | ............. | B60B 3/147 301/63.107 |

FOREIGN PATENT DOCUMENTS

| | | |
|---|---|---|
| CN | 101 52 8478 A | 9/2009 |
| DE | 145296 C | 10/1903 |
| DE | 30 41 044 A1 | 5/1982 |
| DE | 32 39 481 A1 | 6/1983 |
| DE | 29824507 U1 | 3/2001 |
| DE | 20022351 U1 | 6/2001 |
| DE | 10 2006 051 867 A1 | 5/2008 |
| DE | 102007019611 A1 | 10/2008 |
| DE | 102008046255 B3 | 3/2010 |
| DE | 102009050458 A1 | 4/2011 |
| EP | 1140525 B1 | 2/2007 |
| EP | 23 63 272 A1 | 9/2011 |
| EP | 2363273 A1 | 9/2011 |
| JP | 2009-26242 A | 11/2009 |

* cited by examiner

WHEEL SPIDER

CROSS REFERENCE TO RELATED APPLICATIONS

This application is a United States National Phase application of International Application PCT/EP2012/074185 filed Dec. 3, 2012 and claims the benefit of priority under 35 U.S.C. §119 of German Patent Application DE 10 2011 087 938.2 filed Dec. 7, 2011, the entire contents of which are incorporated herein by reference.

FIELD OF THE INVENTION

The invention relates to a wheel spider, for wheels, especially of automobiles, which has spokes made of fiber composite. Further, a method for the manufacture of such a wheel spider is disclosed.

BACKGROUND OF THE INVENTION

A common wheel design has a well, which consists of a rim well and the wheel flanges. The wheel flanges circulate the rim well on both sides, overlap this rim well and offer the tire lateral support. The wheel spider or wheel disk is used for fastening the wheel. Thereby, a wheel spider has spokes or other connections from the rim to the hub, which is arranged in the center of the wheel. A wheel disk performs the same task without spokes, as an all-over connection of the rim to the hub.

It is a constant endeavor to reduce the weight of motor vehicles, especially of the unsprung masses, in the further development of automobile technology. The use of lightweight materials, especially of fiber composites, is offered for this.

There is already a number of approaches to contribute to weight reduction by means of substituting metal spokes with fiber composites. However, in these substitutions, stability requirements may not fade into the background.

U.S. Pat. No. 4,681,647 suggests connecting a metallic hub with a ring-shaped surrounding element. Thereby, the hub is wound around with long reinforcement fibers, which run between the hub and the outer ring, or the hub has pin-like elevations for this, around which the reinforcement fibers are placed and then led to the outer ring. The outer ring is itself wound around one or more times, whereupon the reinforcement fiber is led back to the hub. Another embodiment also provides on the outer ring pin-like elevations, which are correspondingly wound around. The long reinforcement fibers have a plastic impregnation and can be hardened after the completion of the winding between the hub and ring. They then form the spokes of the wheel. The drawback of this design is that the reinforcement fibers run unidirectionally between the hub and ring and have a low resistance to stresses parallel to the axial direction. The manufacturing process is complicated and time-consuming because of the complicated winding.

DE 10 2006 051 867 A1 discloses how a wheel spider consisting of a plurality of rings made of a fiber-reinforced material can be constructed. A plurality of rings made of reinforcement fibers are fitted into the space between the rim and the hub. The rings are not yet hardened and are deformed into arc-like shapes with round corners. The circular segment of the arc is positioned in an ideal shape at the inner surface of the rim, while the chords of the arcs are in contact with each other and form the spokes after consolidation. The arcs are connected in substance with each other or with the rim by means of matrix material. The drawback of this design is that the rings made of reinforcement fiber material are wound unidirectionally and hence have a low resistance to forces in the axial direction. In addition, the structure of the spokes only allows straight designs lying in the plane of the hub.

SUMMARY OF THE INVENTION

An object of the present invention is set to propose a wheel design, which connects the weight advantages of a fiber composite construction with a good resistance to axial stresses. A further object is to make possible an aesthetically appealing shape of the wheel design.

This object is accomplished with a wheel spider for a wheel of the present invention and a process for the manufacture of such a wheel.

The wheel according to the present invention has a wheel spider, whose spokes consist of one or more linearly stretched textile strands (also: textile strands) as reinforcement material of a fiber composite. Each linearly stretched textile strand runs back and forth at least once between the rim and the hub and thereby forms at least one spoke. Within the meaning of this application, linear is defined as the textile strand having at least two ends, which are not connected with one another. The textile strand can thereby be curved one or more times in one or more directions.

In a preferred embodiment, a linearly stretched textile strand forms a spoke of the wheel. The ends of the textile strand are thereby fastened in the consolidated state to the rim in a positive-locking manner and preferably also in substance, while the center of the textile strand is deflected at the hub. Thus, the textile strand forms two partial strands, which are laterally adjacent to each other in their course between the hub and the rim and without any distance are preferably also connected in substance by means of the matrix material.

In another preferred embodiment the linearly stretched textile strand forms two spokes of the wheel. The ends of the textile strand are fastened in the consolidated state to the rim in a positive-locking manner and preferably also in substance, while the center of the textile strand is deflected at the hub. The two partial strands are separated in their course between the rim and the hub and form an angle with the reversal point in the hub as vertex.

A fiber composite consists at least one matrix material and reinforcement fibers, which improve the ability of the fiber composite to withstand stress in the direction of its course. Consolidating or consolidation is defined here by the fiber composite being hardened. This can occur partially (partial consolidation) or take place completely. The fiber composite is unconsolidated when no process of consolidation has taken place. During the consolidation, the matrix material hardens and encloses the reinforcement fibers and fixes them in their position.

Adjacent spokes preferably run at constant angles to one another and are uniformly distributed over the entire circumference of the wheel spider. However, another preferred embodiment also provides spokes, arranged in pairs, with a smaller enclosed angle and a larger angle to the next pair of spokes or vice versa.

In another preferred embodiment, the linearly stretched textile strand forms more than two, but always an even number of spokes. For this purpose, the ends of the textile strand are fastened in the consolidated state to the rim in a positive-locking manner and preferably also in substance, while it runs from the fastening of the first end to the hub, is deflected there and runs back to the rim. This advantageously takes place so often until the number of intended spokes is reached. In this way, the spokes are formed from a single linearly stretched textile strand. A plurality of linearly stretched textile strands, whereby each textile strand or even only some of the textile strands form more than two spokes of a rim, is also preferred.

The ends of the textile strands are preferably bent over and follow the curvature of the rim on its inner side in one of the directions of rotation. The ends of a plurality of adjacent textile strands preferably uniformly point towards one another or away from one another.

The linearly stretched textile strands are preferably designed as scrim, knitted fabric, mesh, fabric, or multiaxial textiles. The textile strands preferably also consist of a plurality of layers, which are advantageously stitched together or, e.g., held together by means of adhesive spray.

In an especially preferred embodiment the textile strands are braided and preferably have a plurality of fiber directions. Preferably, the fibers run at an angle of ±45° to the axis of a spoke. The orientation of the textile strands can be varied over the length, such that the most favorable can be provided for the stress. For this purpose, the textile strands are preferably manufactured in a three-dimensional braiding process. Advantageously, textile strands of variable geometry can thus be produced. The textile strands thus preferably have a greater diameter in the vicinity of the hub and can be divided into two or more partial textile strands in the area of the fastening to the rim and also then again converge into one textile strand.

The textile strands consist of reinforcement fiber material according to the state of the art. High-strength fiber materials such as glass fibers, carbon fibers or Kevlar (aramid) fibers are preferred.

The hub preferably has an axle hole and/or bolt holes for fastening the wheel. In addition, the hub also preferably has pin-like elevations, around which the textile strands run without interruption and by means of which the textile strands are deflected. In an especially preferred embodiment, the pin-like elevations are designed, such that on the side that is facing the geometric axis of the hub, there is a rounding, about which the textile strands run, whereby the force is advantageously distributed on the entire contact surface by the pin-like elevation and the textile strand. The part, of the pin-like elevations, which is facing the rim, runs in its outer surface preferably parallel to the inner surface of the rim. At the site, at which the textile strands pass through the surface of the pin-like elevations, the pin-like elevations are somewhat rounded off to avoid a notch effect of the pin-like elevation on the textile strand. Preferably, the hub has alternating pin-like elevations with textile strands running about these without interruption and pin-like elevations without textile strands. Only every second pin-like elevation thus holds a textile strand, whereby due to the pin-like elevations being arranged between them, the impression of a closed hub surface in the direction of the inner side of the rim is achieved, however. In a preferred embodiment the hub has only pin-like elevations, which also hold textile strands, while the intermediate spaces between the pin-like elevations with the textile strands running around them are filled with hub material.

The hubs preferably have a two-part design. There is preferably a first hub part with a plate-shaped lower blade end, which optionally has, besides the axle opening and/or bolt openings, also pin-like elevations with a height, which corresponds to the width of the textile strands. The second hub part then has only optionally an axle opening and/or bolt openings and is positioned on the first hub part and fixed there. The textile strands running about the pin-like elevations are advantageously axially fixed and secured against shifting in this way. The bolt holes preferably run through the pin-like elevations.

Another preferred hub shape provides for the linearly stretched textile strands to be led only through recesses in the hub material. An axial slipping is prevented by means of flat, preferably circular-disk-shaped limitations of the hub parts, which are arranged above and below these recesses. After the consolidating of the linearly stretched textile strands and the mounting of the rim, the linearly stretched textile strands are fixed in a positive-locking manner and optionally also in substance via the matrix material. The hub parts optionally have an axle opening and/or bolt openings.

Another preferred embodiment of the hub provides for manufacturing first and second parts of the hub. Each hub part thereby has, besides the optional axle opening and/or the optional bolt openings, some of the pin-like elevations. In a preferred embodiment, 50% of the number of the pin-like elevations are arranged on the first hub part and 50% on the second hub part. In another preferred embodiment, each hub part has pin-like elevations with half of the overall height, such that the pin-like elevations are available in their needed overall height after joining the two hub parts together. It is obvious to the person skilled in the art that, when the number of pin-like elevations is not an even number, he distributes the pin-like elevations as uniformly as possible, e.g., alternating on the two hub parts. It is also obvious that, when the height of a pin-like elevation of a hub part is 30% of the necessary overall height of the pin-like elevation, a pin-like elevation on the other hub part with a height of 70% of the overall height stands opposite this hub part. The overall height of the pin-like elevations between the two hub parts corresponds to the width of the textile strand that runs around them. Likewise, the free space, which runs around the pin-like elevations through the material of the hub, corresponds to the height of the circulating textile strand.

The two hub parts are preferably fixed by bolting or by these being held together via the bolt holes during the mounting of the wheel. In a preferred embodiment, the hub also consists of fiber composite and the two hub parts are joined together in the course of the consolidation of the fiber composite and held in substance via the matrix material.

The hub preferably consists of material that is known from the state of the art for such purposes. This may be, e.g., deep-drawing steel, aluminum, magnesium, or light metal alloys. However, fiber-reinforced plastic is also preferably used.

The rim of the wheel consists, in a preferred embodiment, of fiber composite. Especially preferred here is a multilayer braided fiber reinforcement. The wheel spider is fastened preferably by the ends of the linearly stretched textile strands and, if present, the sections of the linearly stretched textile strands, which run along the inner side of the rim, being braided over and thus extending into the rim in the consolidated state, without, however, fibers from the fiber strands of the wheel spider passing over into fibers of the fiber reinforcement of the rim. After the consolidation of the rim, the ends of the textile strands and the parts of the textile strands running along the inner side of the rim are fixed in a positive-locking manner and optionally also in substance via the matrix material in the rim body.

Another preferred embodiment provides for the rim to have, in its inner circumference, beads, into which the ends of the linearly stretched textile strands and, if present, the sections of the linearly stretched textile strands, which run along the inner side of the rim, extend, and in which these are consolidated. In this way, a wheel spider made of fiber composite can advantageously be fastened in a metal rim in a positive-locking manner.

Another preferred embodiment provides for each linearly stretched textile strand to form two spokes and for each of the two ends of the textile strand to be divided into two single ends.

In a first embodiment, the single ends are divided (preferably at 50% of the material thickness) in a plane parallel to the axis of the wheel. They are spread apart on the inner side of the rim and form the positive-locking connection between the wheel spider and the rim after the consolidating. After the spreading apart, the two ends follow the curvature of the rim on the inner side thereof in the and against the directions of rotation of the wheel. A molding can advantageously be inserted into the V-shaped section between the two ends for stabilization. This molding is preferably formed by a lost core. The molding preferably consists of foam material.

A second preferred embodiment provides for the single ends to be divided in a plane vertical to the axis of the wheel (also preferably at 50% of the material thickness of the textile strands). The ends then embrace a part of the inner side of the rim in both axial directions and follow its contour. After the consolidating of the textile strands, the rim is thus held in a positive-locking manner by means of the ends of all spokes. This embodiment is advantageously suitable for use with metal rims. A formation of beads in the rim material is advantageously not necessary here.

A preferred process for manufacturing linearly stretched textile strands provides for manufacturing them by braiding. A 3D braiding machine is advantageously used here. The linearly stretched textile strands can be manufactured as a continuous product and thereby also be provided with variable cross sections, thickenings, splittings and joinings. For this purpose, the desired wheel size is taken into consideration already when manufacturing the linearly stretched textile strands. The linearly stretched textile strands are then cut to the necessary length and are available for further processing.

Either
a) consolidated or
b) unconsolidated prepared linearly stretched textile strands are used for further processing.

According to a), unconsolidated textile strands are inserted into a mold which specifies the intended curvature and other shaping of the textile strands and is then saturated with matrix material, or if the matrix material is contained in the textile strands, hardens this matrix material. Thermoplastic or duroplastic material is used as the matrix material. Polypropylene is especially preferred as thermoplastic material and epoxy resin is especially preferred as duroplastic material. The consolidated textile strands are then inserted into a mold which already contains the first hub part. Preferably, the ends of the textile strands extend into the rim area. The second hub part is then inserted, and the mold is closed. The rim area is then formed by the mold being braided over. The rim area is then also consolidated. The textile strands between the hub and the rim are now fixed in a positive-locking manner.

According to b), unconsolidated textile strands are inserted into a mold for the rim, which already contains the first hub part. The second hub part is then inserted and the mold is closed. The mold now reproduces the contour of the rim in the outer area. The ends of the textile strands preferably extend into the rim area. Subsequently, the rim mold is braided over. After the braiding process, the entire object consisting of the hub, textile strands and rim is consolidated.

Besides the braiding over of the mold for forming the rim, other methods for fiber deposition known from the state of the art are also advantageously used. Winding as well as the deposition of prepregs made of fiber material are especially preferred here.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
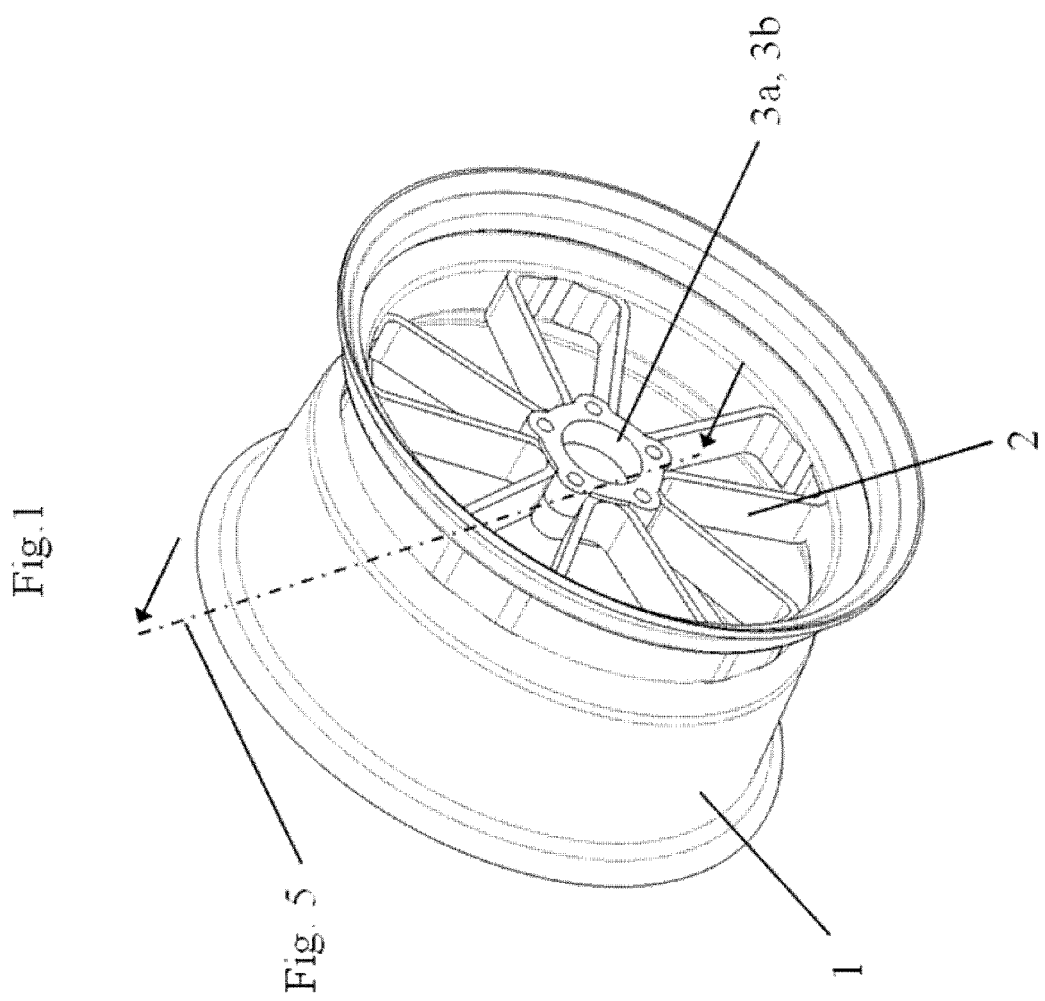
FIG. 1 is a perspective view of a wheel.
Figure 2:
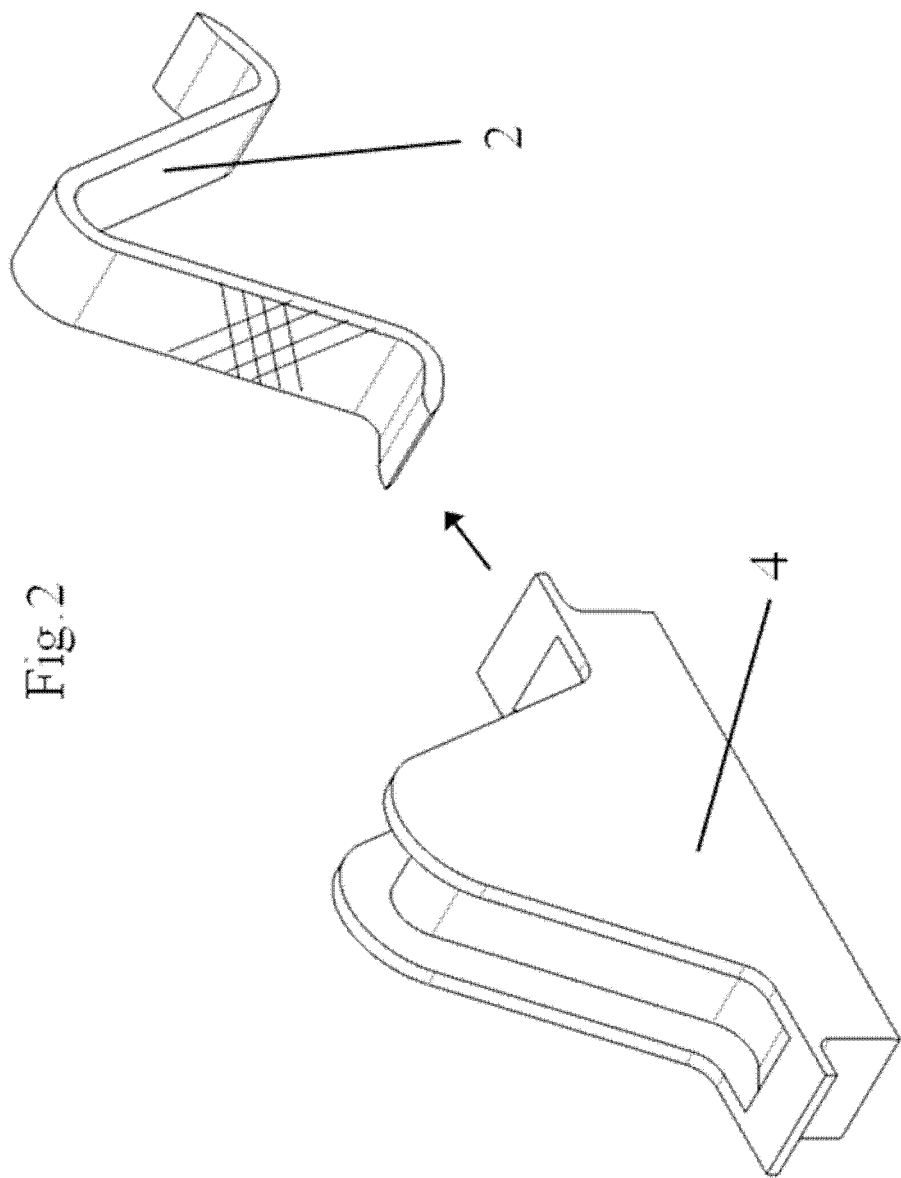
FIG. 2 is a perspective view of a mold and a spoke segment.
Figure 3:
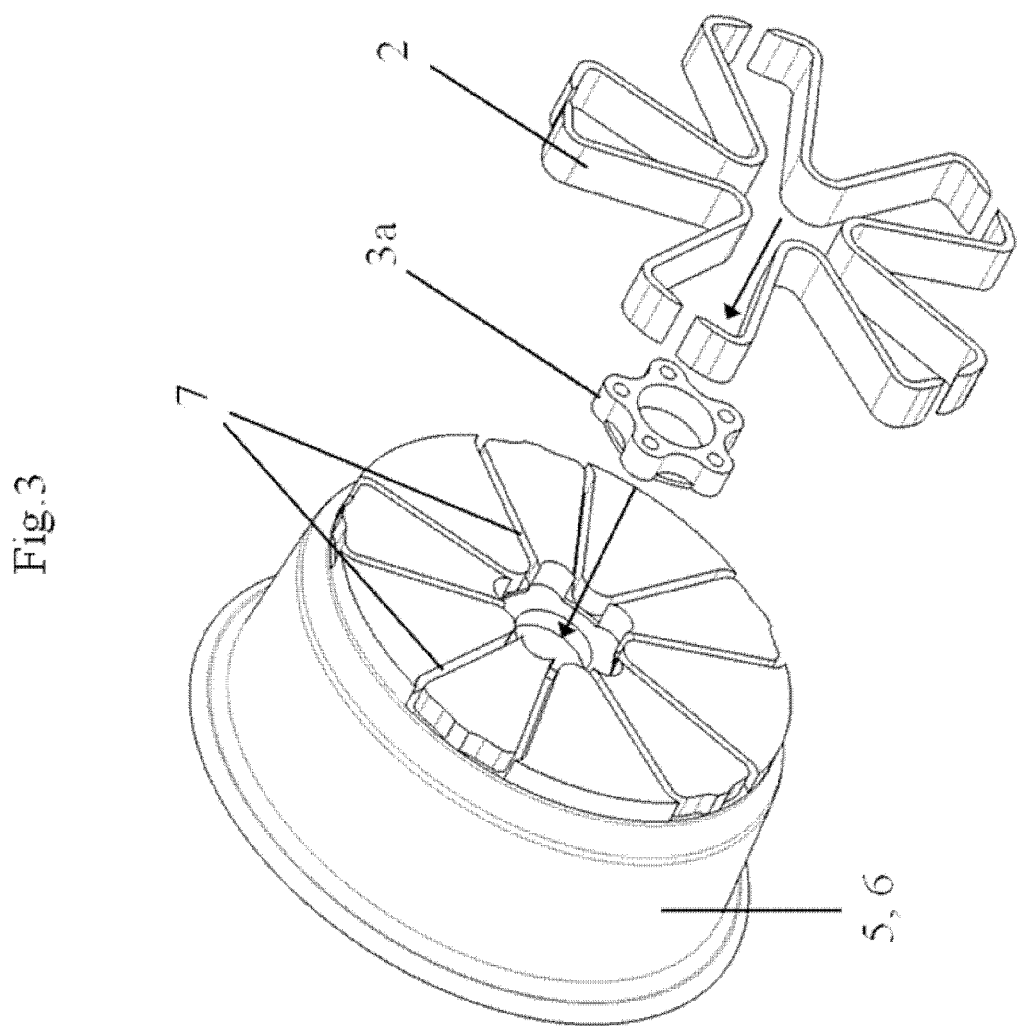
FIG. 3 is an exploded view of a mold half, a hub part and preformed spoke segments.
Figure 4:
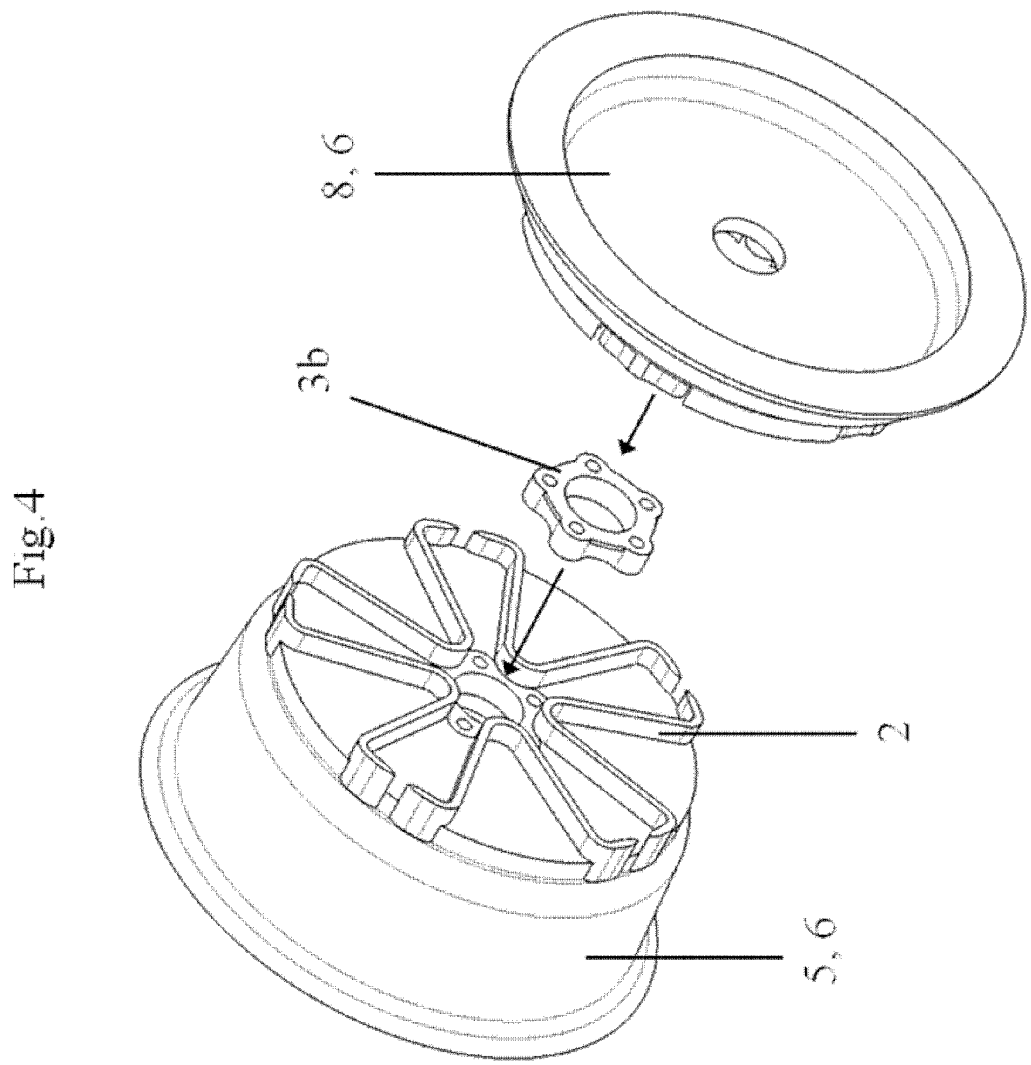
FIG. 4 is an exploded view of mold halves, a hub part and preformed spoke segments.
Figure 5:
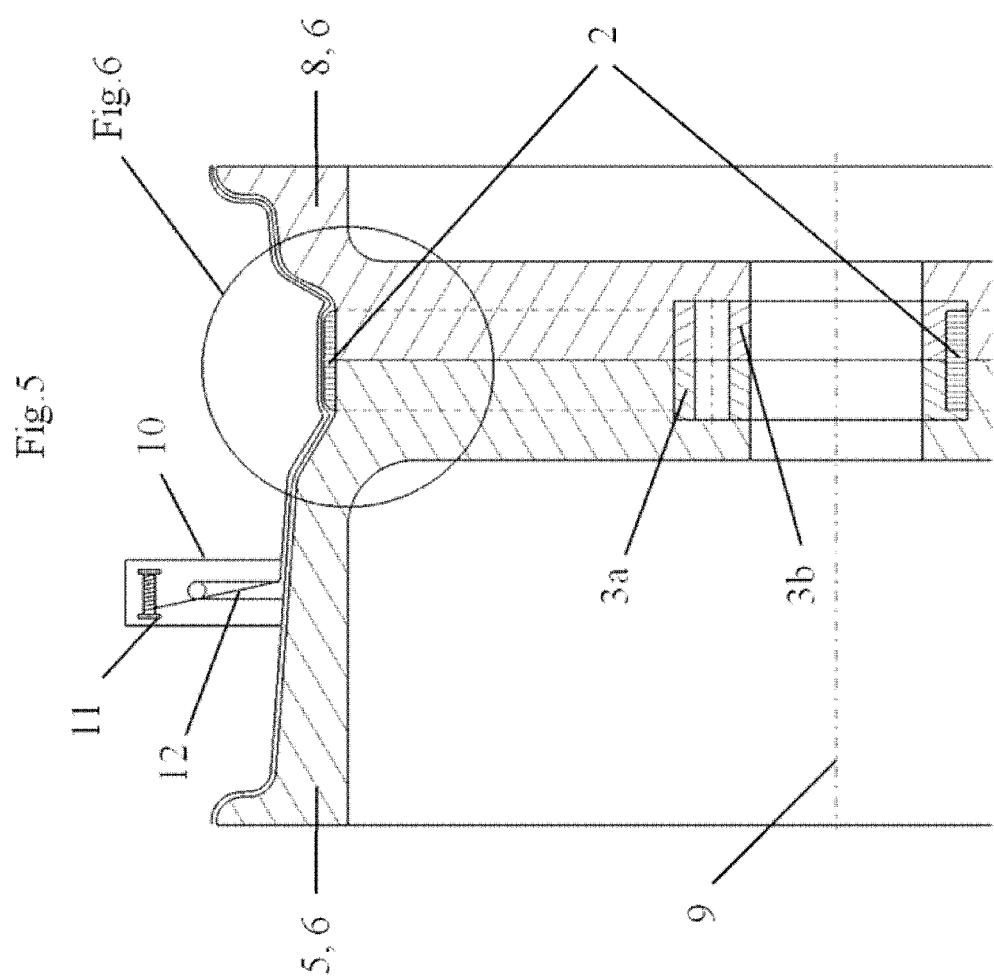
FIG. 5 is a cross sectional view of the wheel spider of FIG. 5.
Figure 6:
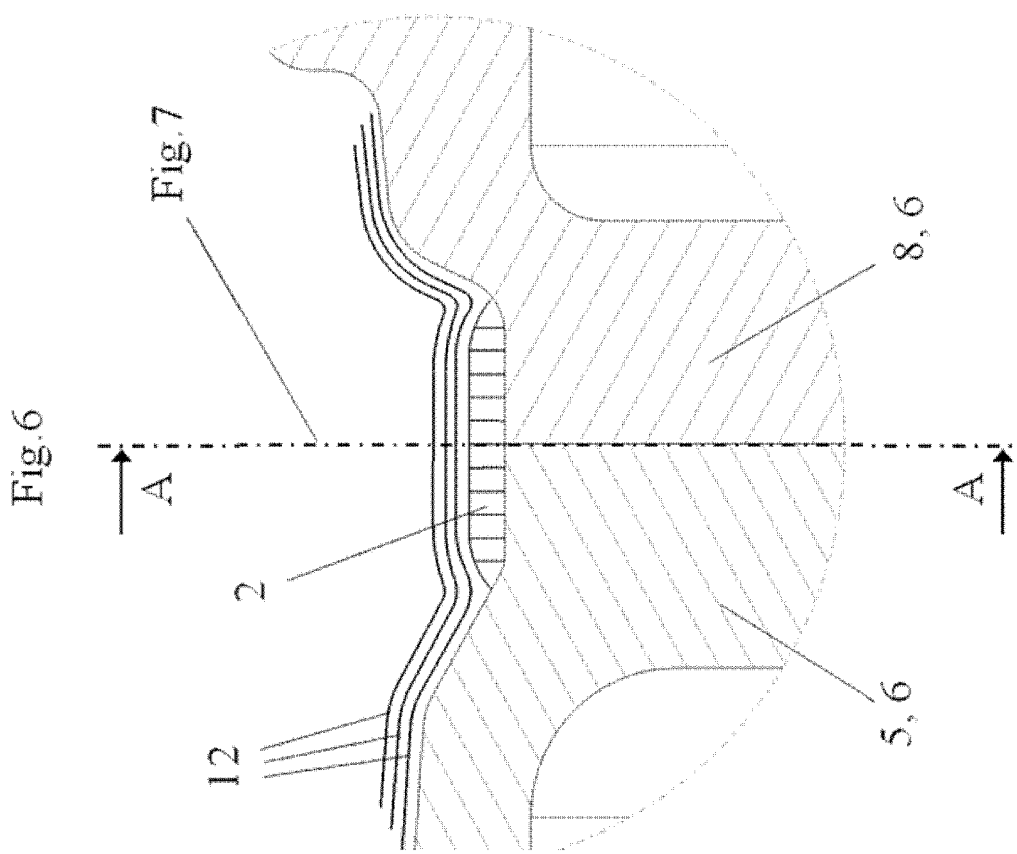
FIG. 6 is a cross sectional view of the wheel spider of FIG. 5.
Figure 7:
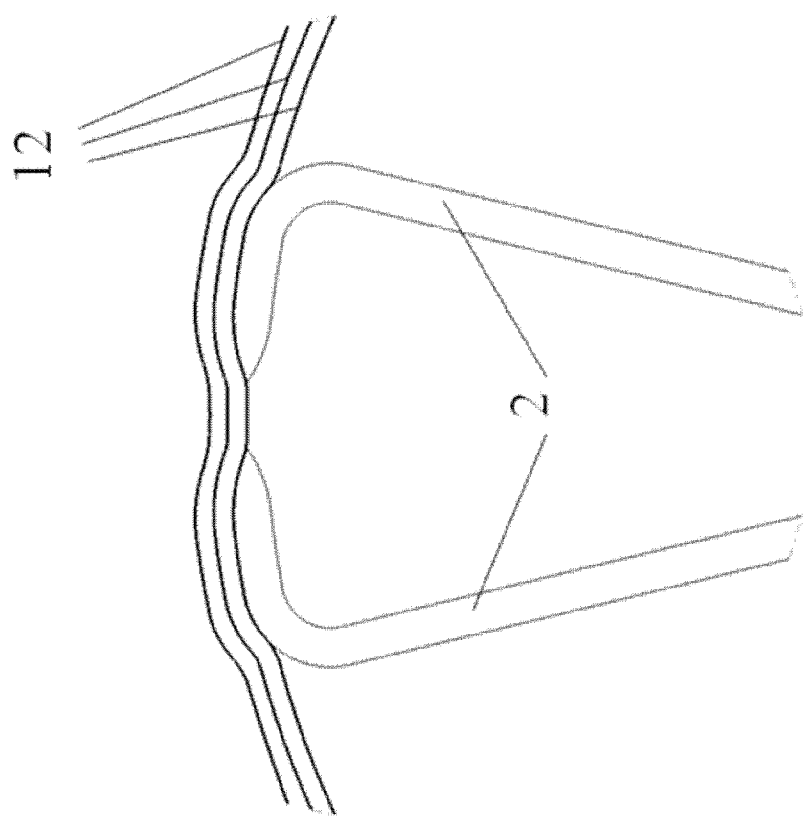
FIG. 7 is a sectional view of the wheel spider of FIG. 6.

Referring to the drawings in particular, FIG. 1, FIG. 2, FIG. 3, FIG. 4, FIG. 5, FIG. 6 and FIG. 7 show one embodiment of the present invention. A wheel spider is constructed from individual, preformed spoke segments (2). The spoke segments (2) are shaped here in separate molds (4), in which the lengthwise stretched textile strand is draped. It is possible, in this case, to consolidate the spoke segments (2) in advance. The first hub part (3a) as well as the preformed spoke segments (2) are then inserted into the insertion grooves (7) of the first mold half (5) of the mold. After the second hub part (3b) is applied and the mold halves (5, 8) are closed, the formation of the rim well (1) takes place by braiding over the molds (5, 8) acting as a braiding core (6). The spokes (2) are thereby integrated axially and radially via a positive locking into the textile structure of the rim well (1). A multipart outer mold is used in the area of the rim well (1) for pressing the textile preform during the consolidation. After the consolidation, the wheel spider and rim well are connected in a positive-locking manner and in substance.

Figure 8:
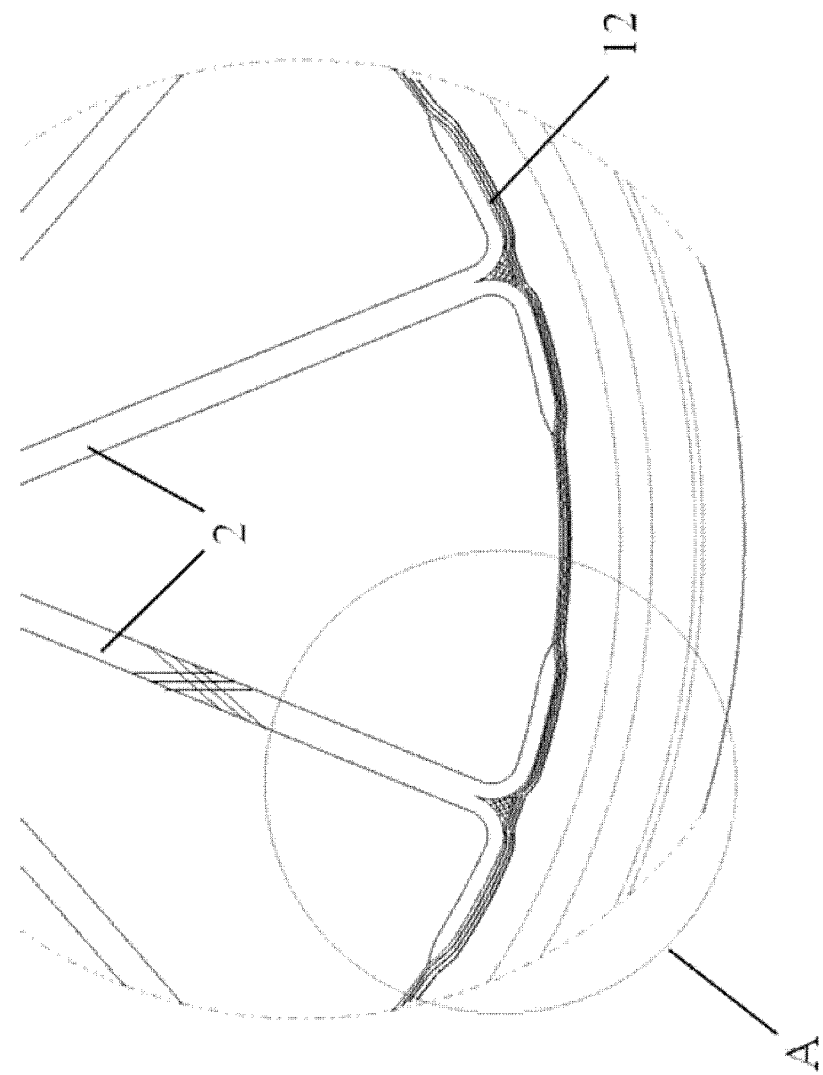
FIG. 8 is an enlarged view of another embodiment of a wheel spider.
Figure 9:
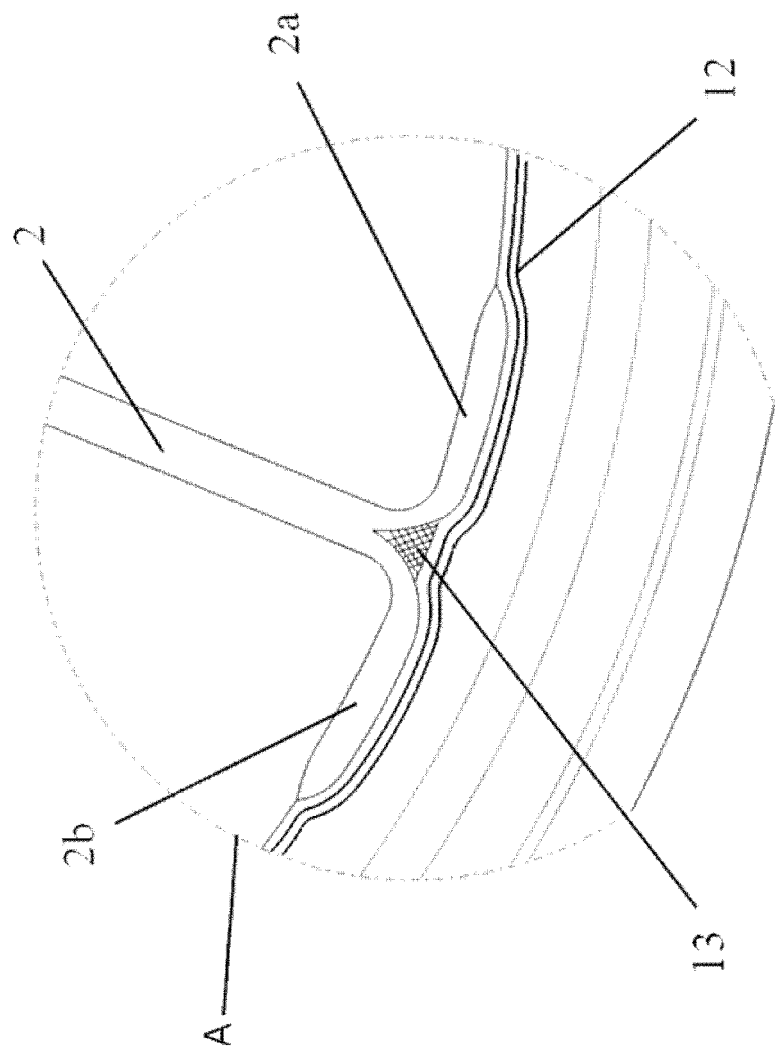
FIG. 9 is an enlarged view of the detail A of FIG. 8.
Figure 10:
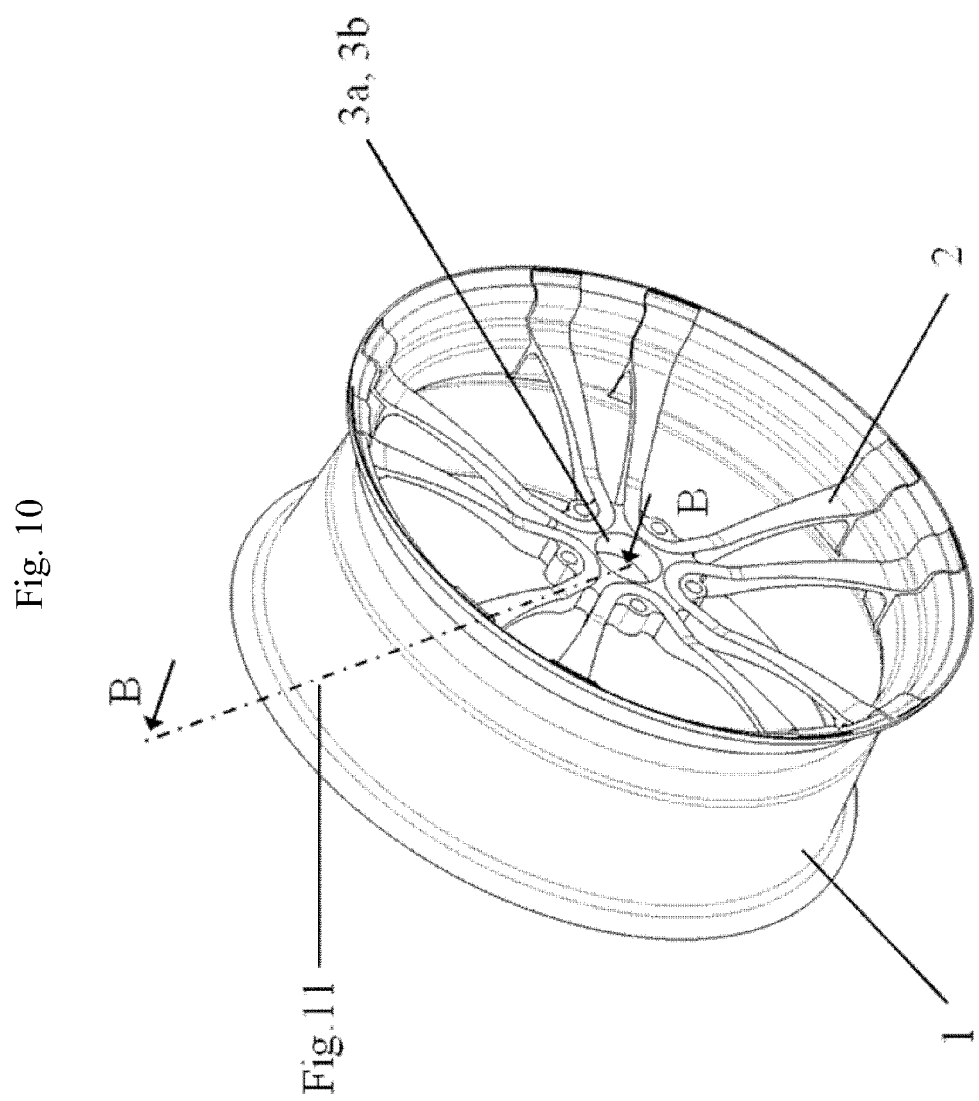
FIG. 10 is a perspective view of another embodiment of a wheel.
Figure 11:
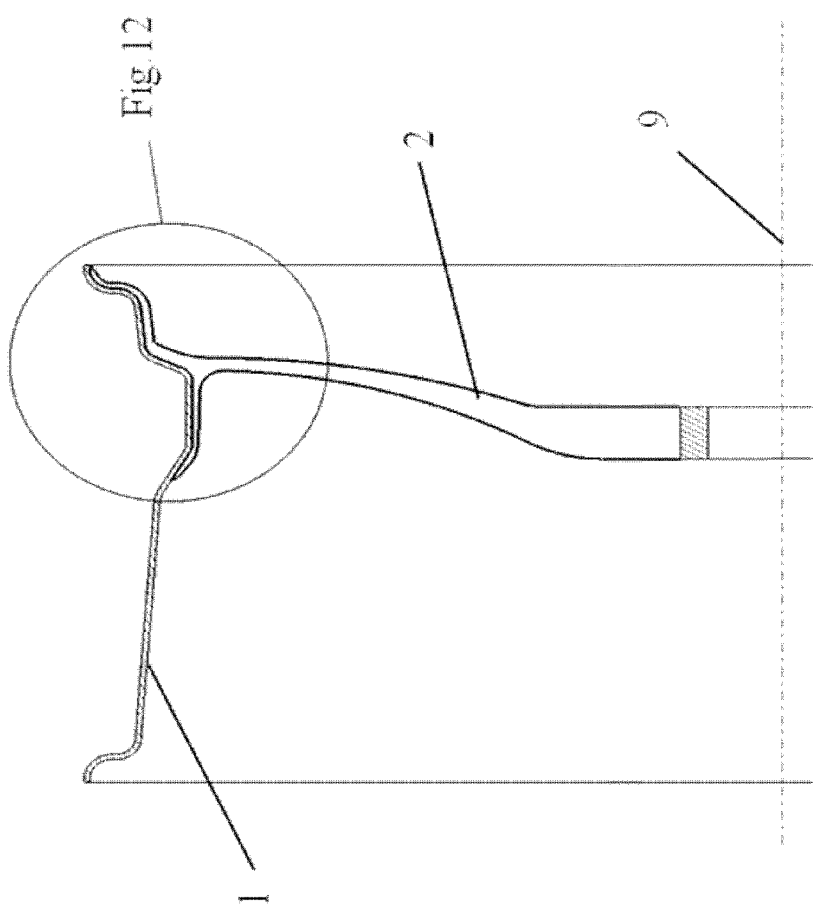
FIG. 11 is a cross sectional view of the wheel of FIG. 10.
Figure 12:
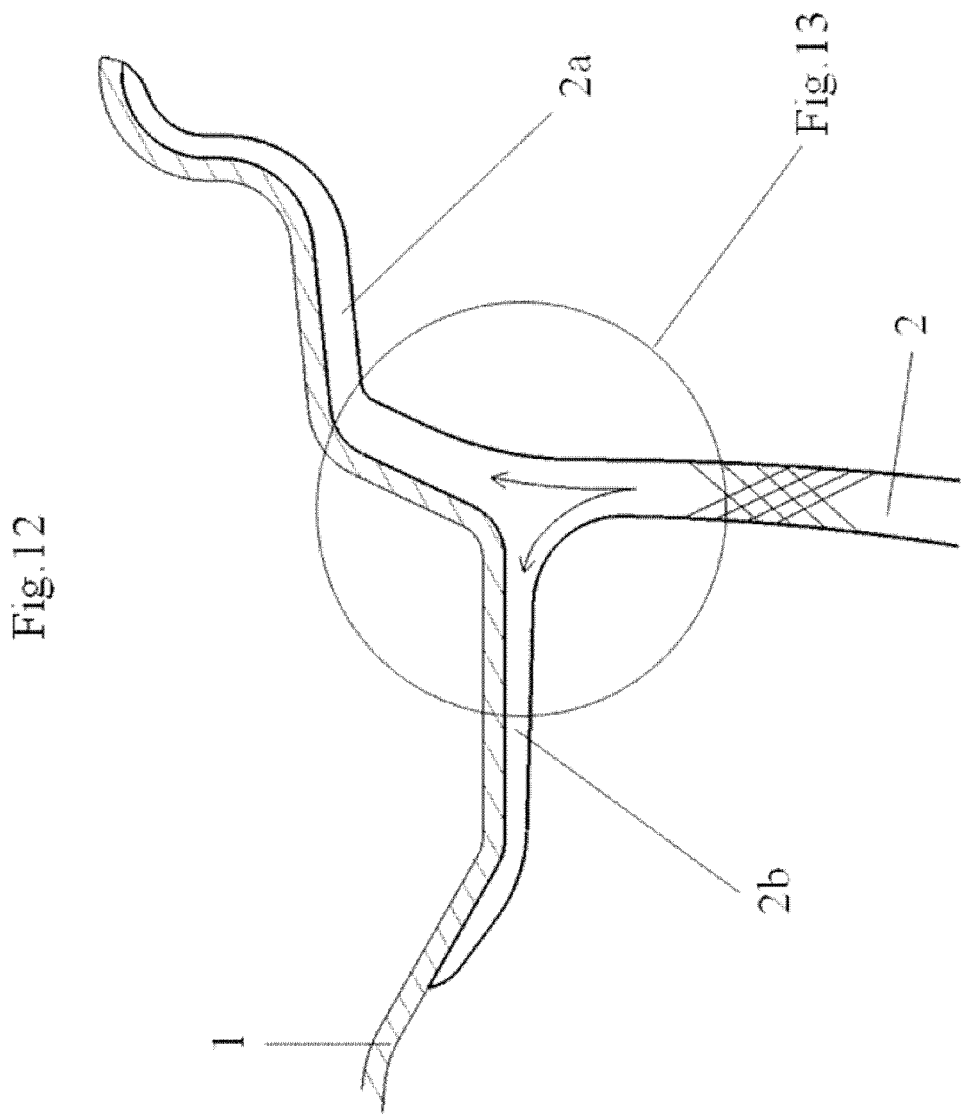
FIG. 12 is an enlarged cross sectional view of FIG. 11.

FIG. 8 and FIG. 9 show another embodiment of the present invention. The spokes (2) of the wheel spider are formed by draping the unconsolidated lengthwise stretched textile strand in the mold half 1 of the rim mold, as well as the wheel hub half 1 inserted therein. In order to guarantee an as large as possible connecting area between the spokes and the rim well, a spreading apart, on both sides, of the ends of the textile strand used for the spokes in the area of the rim well takes place here. The V-shaped recess formed here between the spread-apart textile layers is closed by means of a wedge-shaped inlay. After the wheel hub half 2 is applied and the mold halves are closed, the formation of the rim well takes place by braiding over the mold acting as a braiding core. The spokes are thereby axially and radially integrated via a positive locking formed in an undercut area into the textile structure of the rim well. A multipart outer mold is used in the area of the rim well for pressing the textile preform during the consolidation.

After the consolidation, the wheel spider and rim well are connected in a positive-locking manner and in substance.

Figure 13:
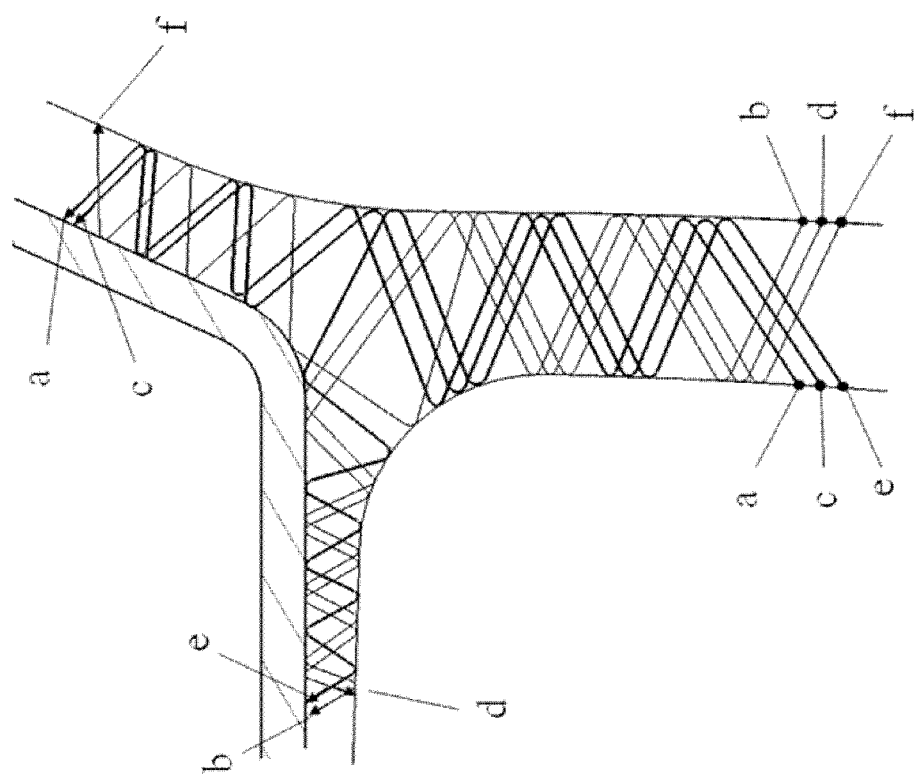
FIG. 13 is an enlarged cross sectional view of FIG. 12.
Figure 14:
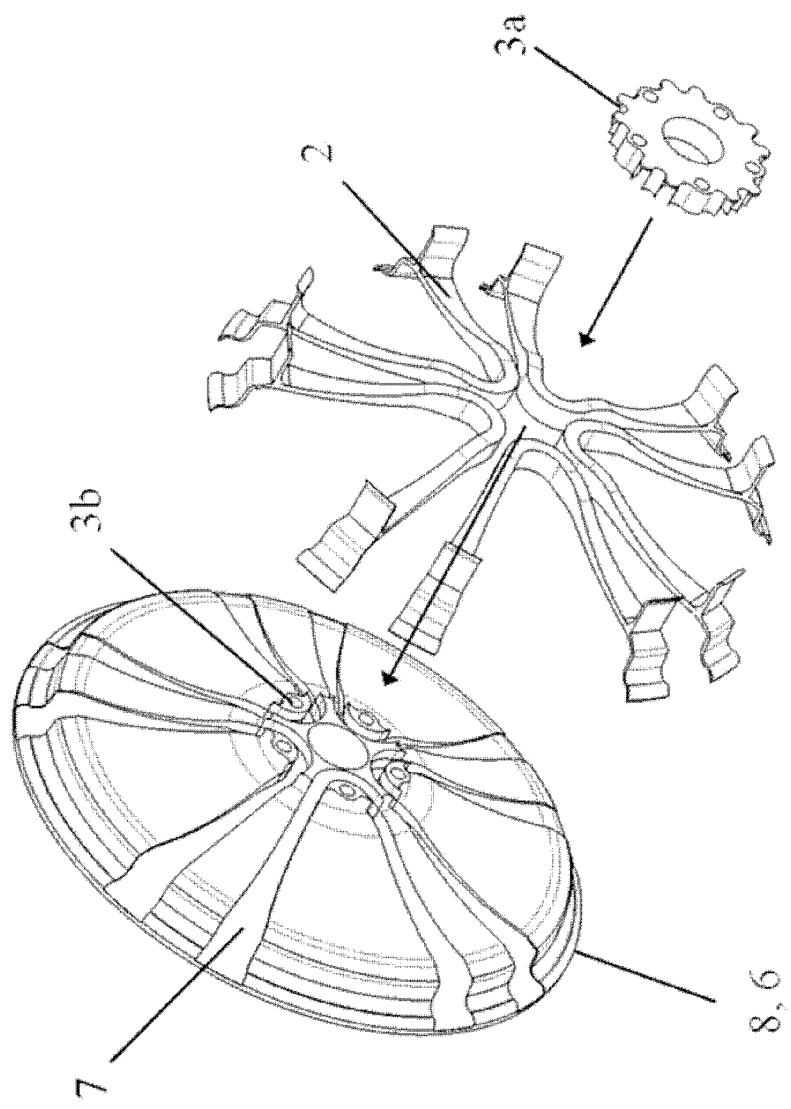
FIG. 14 is an exploded view of textile strands together with a mold part for a hub.

FIG. 10, FIG. 11, FIG. 12, FIG. 13, FIG. 14, FIG. 15 and FIG. 16 show yet another embodiment of the present invention. The connection of the lengthwise stretched textile strand to the rim well takes place by means of a positive locking formed in an undercut area, whereby the textile extends axially over the well as well as the outer flange geometry of the rim well. FIG. 14 shows how the lengthwise stretched textile strands together with a mold part for the hub are draped in the mold.

FIG. 13 illustrates how the fiber course of the fibers (a-f) passes over, without interruption, from the one-part central section into the spread-apart end of the textile strand. In the undivided section of the textile strand, the fibers here run at angles of +45° (e, c, e) as well as −45° (b, d, f) to the axis of the textile strand. After the dividing and spreading apart, the first part has the fibers b, d and e and the second partial strand has the fibers a, c and f. In addition, the fibers also run after the dividing at angles of ±45° to the axis of the respective partial strand.

Figures 15, 16:
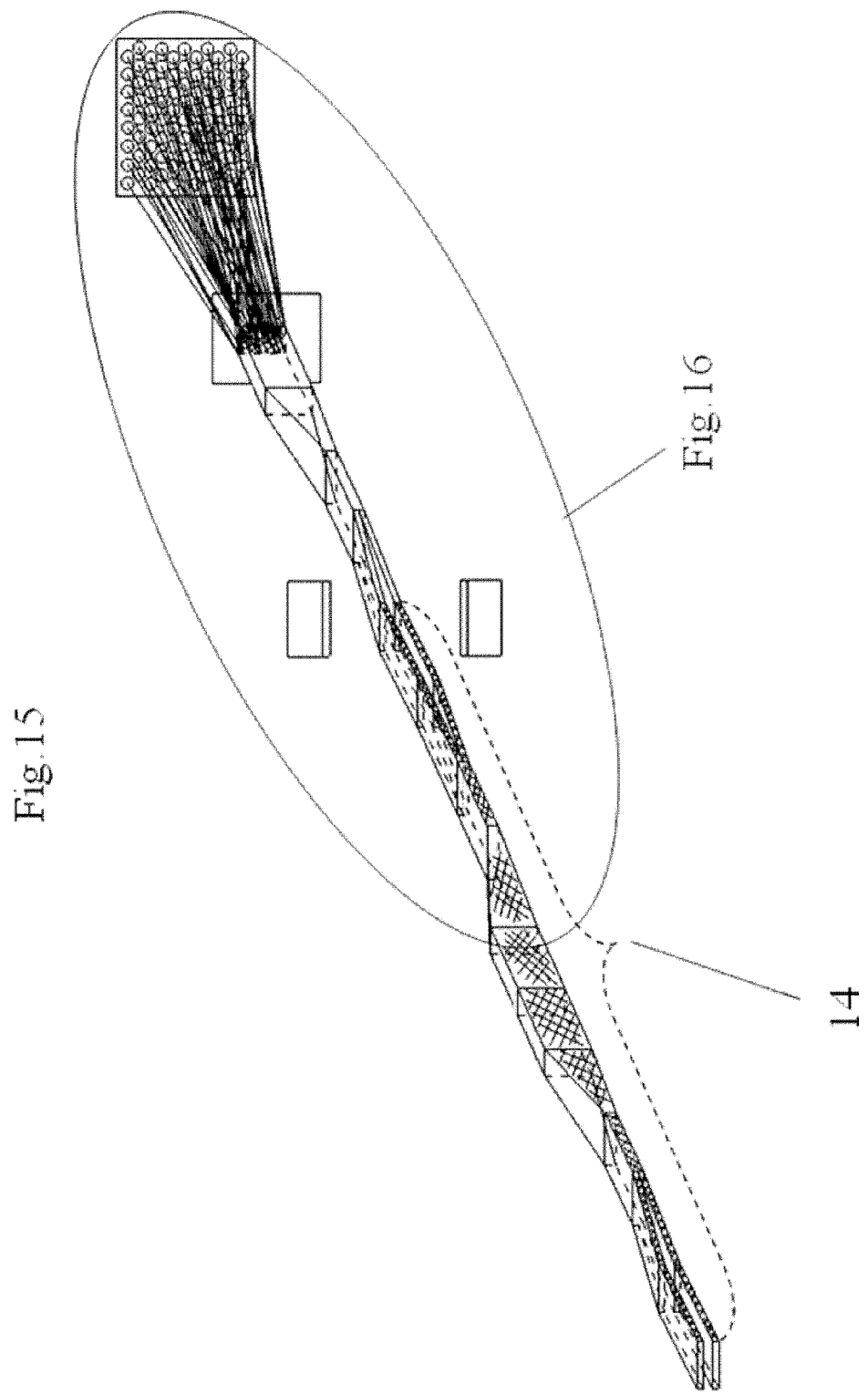
FIG. 15 is a view of a three-dimensional braiding machine.
FIG. 16 is an enlarged view of the three-dimensional braiding machine.
Figure 16:
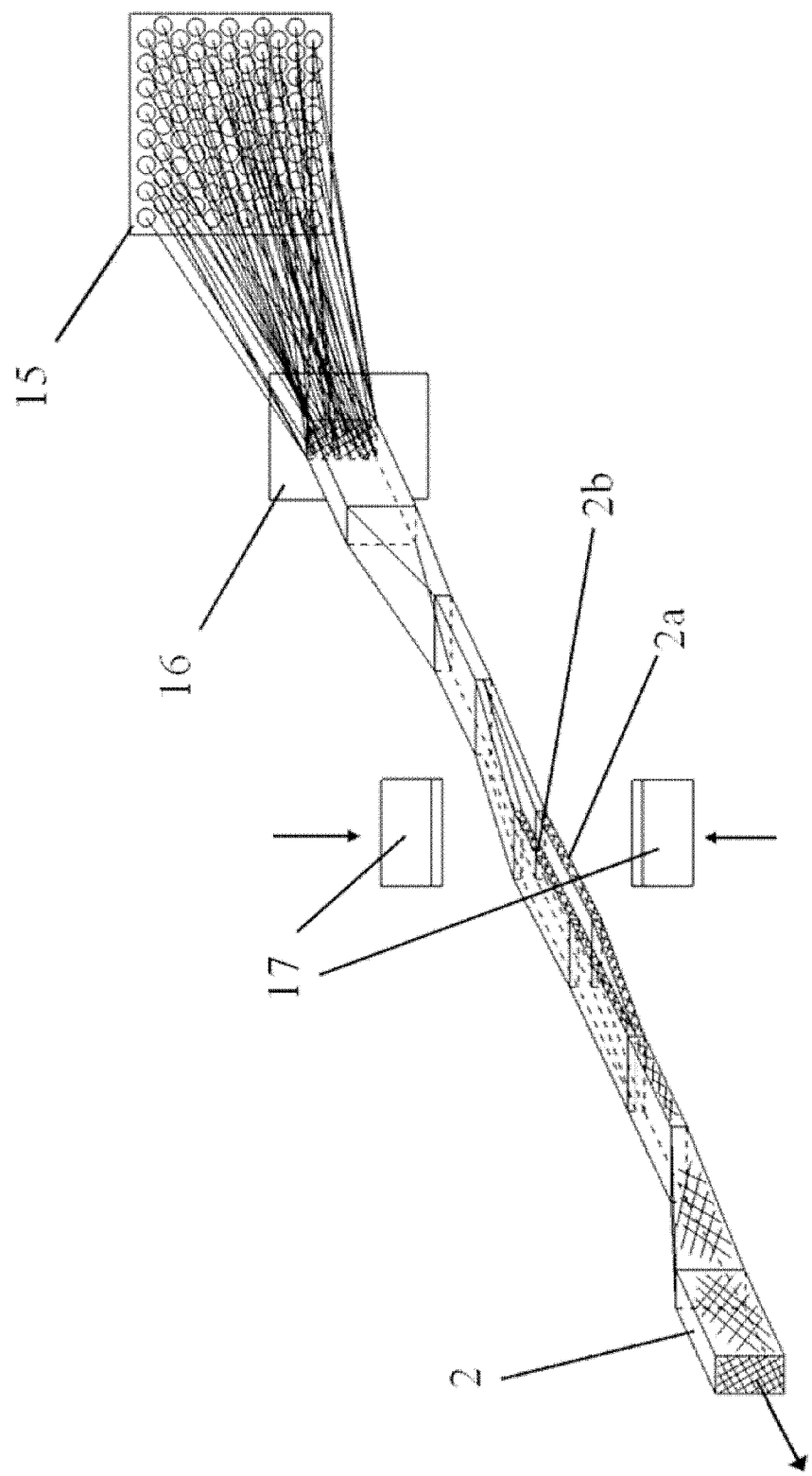

The lengthwise stretched textile strands of the spoke segments have different cross sections, which are used for a shaping of the wheel spider corresponding to stress. The preforming of the spoke segments with different cross sections as well as the spreading of the spoke ends into two fiber strands (2a, 2b) each is achieved by means of a 3D braiding machine (FIG. 15). This makes it possible to manufacture a continuous 3D textile, which consists of a plurality of spoke segments strung together, which are separated from one another by means of a separating device according to the state of the art (e.g., lever shears, automatic cutter) (FIG. 16 as a magnification of detail C of FIG. 15).

While specific embodiments of the invention have been shown and described in detail to illustrate the application of the principles of the invention, it will be understood that the invention may be embodied otherwise without departing from such principles.

The invention claimed is:

1. A wheel, comprising:
   a rim;
   a wheel spider having a hub and spokes, said spokes comprising one or more linearly stretched textile strands as reinforcement material of a fiber composite and each linearly stretched textile strand extending at least once from the rim to the hub and back without interruption to form at least one spoke, wherein:
   the linearly stretched textile strands have ends, which are divided in a plane parallel to an axis of the wheel, spread apart and fastened in a positive-locking manner in two directions of rotation of the wheel in a well; or
   the linearly stretched textile strands have ends, which are divided in a plane vertical to an axis of the wheel, spread apart and are joined to a contour of an inner side of the rim in an axial direction following the rim to bring about a positive-locking fastening.

2. A wheel in accordance with claim 1, wherein the spokes and the hub are connected in a positive-locking manner.

3. A wheel in accordance with claim 2, wherein each linearly stretched textile strand extends around pin-like elevations in the hub.

4. A wheel in accordance with claim 2, wherein the linearly stretched textile strand extends through recesses in the hub.

5. A wheel in accordance with claim 1, wherein each linearly stretched textile strand extends around pin-like elevations in the hub.

6. A wheel in accordance with claim 1, wherein the linearly stretched textile strand extends through recesses in the hub.

7. A wheel in accordance with claim 1, wherein at least one of the one or more linearly stretched textile strands forms more than two spokes and, one section of said at least one of the one or more linearly stretched textile strands, which is not identical with ends, extends in an inner surface of a well and ending with the well.

8. A wheel in accordance with claim 1, wherein at a site, at which one end of each linearly stretched textile strand is spread apart, a free space having a triangular cross section, into which an ideally shaped molding is inserted, is formed.

9. A wheel in accordance with claim 1, wherein:
   the spokes and the rim, or the spokes and the hub, are connected in substance; or
   the spokes and the rim and the spokes and the hub are connected in substance.

10. A wheel in accordance with claim 1, wherein each of the ends has a first end portion and a second end portion, the first end portion extending in a direction away from the second end portion, the first end portion and the second end portion being in contact with the rim.

11. A wheel, comprising:
    a rim;
    a wheel spider having a hub and spokes, said spokes comprising one or more textile strands as reinforcement material of a fiber composite and each of said one or more textile strands extending at least once from said rim to said hub and back without interruption to form at least one of said spokes, said one or more textile strands having ends, which diverge from each other and are spread apart from each other, said one or more textile strands being fastened to one of said rim and a well of the wheel via a positive-lock connection, said positive-lock connection comprising one of at least a portion of said rim and at least a portion of said well.

12. A wheel in accordance with claim 11, wherein said ends are joined to a contour of an inner side of the rim in an axial direction following the rim, said positive-lock connection comprising said inner side of said rim.

13. A wheel in accordance with claim 11, wherein each of said one or more textile strands extends around pin-like elevations in said hub.

14. A wheel in accordance with claim 13, wherein each of said one or more textile strands extends around pin-like elevations in said hub, said spokes and said hub being connected via another positive-lock connection, said another positive connection comprising said pin-like elevations.

15. A wheel in accordance with claim 11, wherein said one or more textile strands extends through at least one recess in said hub, said one or more textile strands being connected to said hub via another positive lock connection, said another positive lock connection comprising said at least one recess.

16. A wheel in accordance with claim 11, wherein said ends are positively locked in two directions of rotation of the wheel in said well via said positive-lock connection, at least one of said one or more textile strands forming more than two spokes and, one section of said at least one of said one or more textile strands, which is not identical with ends, extends in an inner surface of the well and ending with the well.

17. A wheel in accordance with claim 11, wherein at a site, at which one end of each of said one or more textile strands is spread apart, a free space having a triangular cross section, into which an ideally shaped molding is inserted, is formed.

18. A wheel, comprising:
a rim;
a wheel spider having a hub and spokes, said spokes comprising a fiber composite, said fiber composite comprising one or more textile strands as reinforcement material of said fiber composite, each of said one or more textile strands extending at least once from said rim to said hub and back without interruption to form at least one of said spokes, said fiber composite having a first end and a second end, said first end diverging from said second end, each of said first end and said second end being fixed to one of said rim and a well of the wheel via a positive-lock connection, said positive-lock connection comprising one of at least a portion of said rim and at least a portion of said well.

19. A wheel in accordance with claim 18, wherein said first end and said second end are joined to a contour of an inner side of said rim in an axial direction following said rim, said positive-lock connection comprising said inner side of said rim.

20. A wheel in accordance with claim 18, wherein said first end and said second end are positively locked in two directions of rotation of the wheel in said well via said positive-lock connection.

* * * * *